Figure 3:
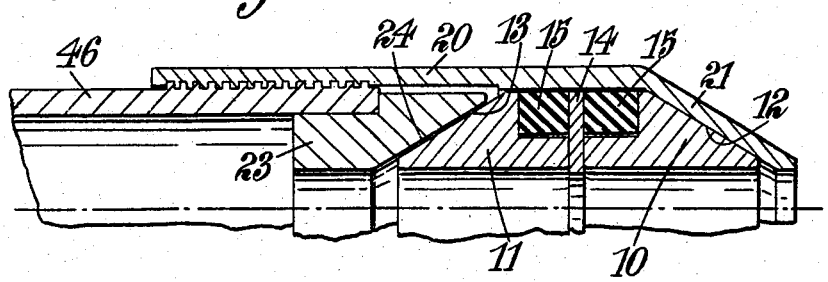

July 22, 1958
H. S. HULL ET AL
2,844,377
CHUCKS WITH JAWS CONNECTED TOGETHER BY
RUBBER BONDED THERETO
Filed Sept. 30, 1955
2 Sheets-Sheet 1
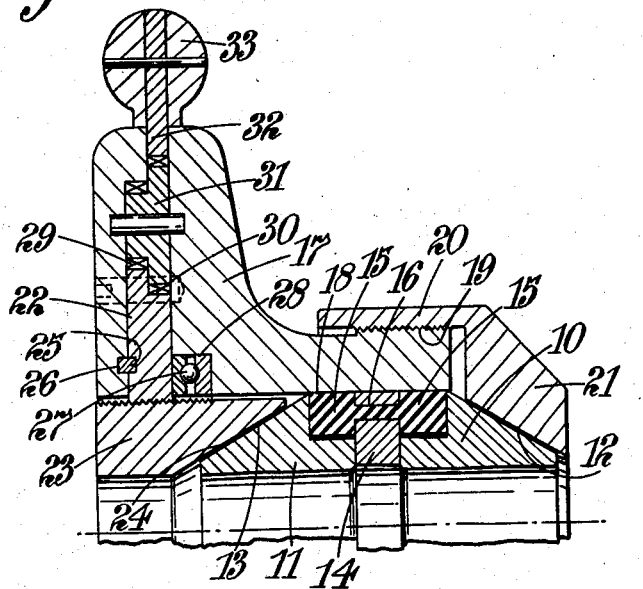
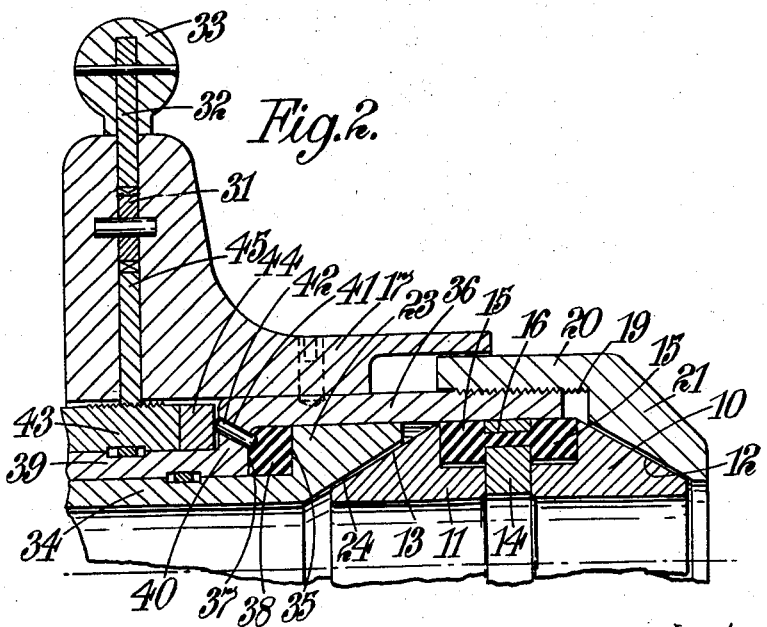
Inventors
Harold Samuel Hull &
Raymond Jack Baker
By Hooper, Leonard & Buell
their attorneys July 22, 1958　　　H. S. HULL ET AL　　2,844,377
CHUCKS WITH JAWS CONNECTED TOGETHER BY
RUBBER BONDED THERETO
Filed Sept. 30, 1955　　　　　　　　2 Sheets-Sheet 2

Inventors
Harold Samuel Hull &
Raymond Jack Baker

United States Patent Office 2,844,377
Patented July 22, 1958

2,844,377

CHUCKS WITH JAWS CONNECTED TOGETHER BY RUBBER BONDED THERETO

Harold Samuel Hull, Westminster, London, and Raymond Jack Baker, East Twickenham, England Application September 30, 1955, Serial No. 537,863

7 Claims. (Cl. 279—58)

This invention relates to chucks particularly for use in lathes.

According to this invention, a chuck comprises a chuck body formed with a number of axially spaced conical sockets, a number of jaws shaped to engage said sockets and circumferentially spaced apart around the axis of rotation of the chuck and which circumferentially spaced jaws are joined together by a continuous ring of rubber bonded thereto but so as to leave unobstructed gaps between adjacent side faces of the jaws, and means for imparting relative axial movement between the jaws and sockets.

The continuous rubber ring may be bonded to a metal carrier. The term "rubber" is intended to include rubber substitutes having similar elastic properties to natural rubber.

In one construction according to the invention, a number of sets of jaws are arranged end to end and are bonded either to separate rubber rings or to different portions of one ring. It will be appreciated that with this arrangement, the work or tool to be gripped by the chuck, is engaged at a number of locations along its length according to the number of sets of jaws employed whereby a firm grip is obtained.

Alternatively a single set of jaws is provided circumferentially disposed apart and each jaw having axially spaced inclined edges for engaging said sockets.

The chuck body may be provided with two axially separated sockets and two sets of jaws are provided which are arranged end to end and respectively engage said sockets.

Alternatively the jaws of a single set are shaped to engage both sockets.

In either of the latter arrangements the ends of the two conical sockets having the larger diameters are arranged nearer one another and the edges of the two sets of jaws or of the single set are appropriately shaped to engage said sockets.

In the case where two sets of jaws are arranged end to end, the adjacent ends of the jaws of the two sets may be cut away to form recesses and in each set of jaws the rubber forms a ring lying within and bonded to the faces of the recesses and to one face of a metal ring which is disposed between the two sets of jaws and against which the heels of the jaws abut.

In such an arrangement the rubber which bonds each set of jaws to the metal ring may be arranged to extend through holes formed in the ring so that the resulting rubber rings are interconnected.

Figure 4:
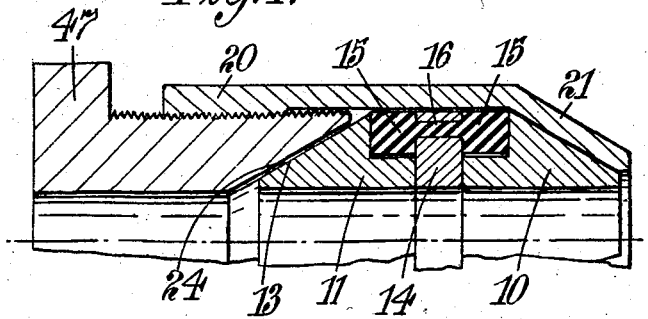
Figure 5:
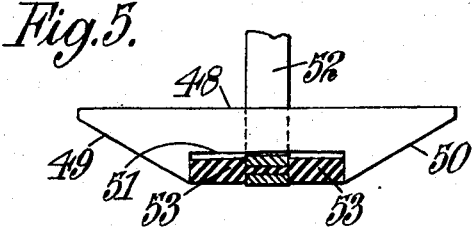

The following is a description of a number of different forms of chucks according to the invention reference being made to the acompanying drawings in which:

Each of Figures 1, 2, 3 and 4 is a section through a part of the chuck in a plane, containing the axis of rotation, and Figure 5 is a section through a part of an alternative form of jaw unit, the reference numerals refer to like parts in the various figures.

In the construction shown in Figure 1 the jaw unit comprisese two sets of jaws 10 and 11 having oppositely inclined outer edges 12 and 13 respectively. The heels of the jaws abut a metal annulus or carrier 14 and are cut away so that each set of cut away portions accommodates a rubber ring 15 which is bonded to a face of the annulus and to parallel faces of the jaws. The rubber of the rings may extend through a hole 16 in the annulus. The chuck body 17 for accommodating that unit is provided with a cylindrical bore 18 and a part of the body is externally threaded at 19 at one end of the bore and is engaged by an internally threaded sleeve 20 having an inwardly directed flange 21, the inner face of which forms a conical socket and overlies the end of the cylindrical bore. The jaw unit is introduced into the cylindrical bore so that the inclined edges of the jaws 10 at one end of the unit engage said conical socket provided by the flange 21. Rotatably mounted in a recess in the chuck body at the other end of the bore, there is a ring 22 the inner periphery of which projects into the bore and is internally threaded to receive an externally threaded sleeve 23 one end of which is formed to provide another conical socket 24 which engages the inclined edges 13 of the jaws 11 at the other end of the jaw unit. The sleeve is keyed to the body 17 so as to prevent relative rotation between these parts but permits axial movement. One face of said ring nearer the end of the chuck body is provided with circumferential groove 25 engaged by a washer 26 fixed to a part of the chuck body while the opposite face of the ring engages a thrust race 27 located in a recess 28 in the body.

It will be appreciated that by rotating the ring 22 axial movement is imparted to the sleeve 23. Rotation is imparted to the ring by means of gearing. For this purpose the outer periphery of the ring 22 may be stepped and formed with two sets of gear teeth 29, 30 which engage gear teeth on a compound pinion 31. The gear teeth on the larger part of the pinion are engaged with internally toothed ring 32 which is rotatable relatively to the body and provided with a hand wheel 33 for rotating it.

Figure 2 shows an alternative arrangement somewhat similar to that described above, instead of the sleeve 23 with the conical socket 24 having an axial movement imparted to it by relative rotation between the internally threaded ring and the internally threaded portion of the sleeve, the sleeve is provided with a reduced portion 34 so as to form a shoulder 35 between that portion and the portion in which the socket 24 is formed and an inner body part 36 is provided with a stepped bore so as to accommodate the two portions 23, 24 of the sleeve and also encircles the jaw unit. The shoulder 37 provided by the stepped bore is spaced away from the first said shoulder 35 and the resulting gap is filled by a block 38 of resilient material such as rubber or synthetic rubber.

The outer surface of the inner body part 36 is also provided with a reduced portion 39 opposite the smaller part of the stepped bore thus forming a transverse wall 40 in which are formed a number of holes 41. A number of pegs 42 extend through these holes so that their ends engage the rubber block 38. The length of the pegs are such that they may project from both sides of the transverse wall 40. Encircling the reduced portion of the chuck body is an externally threaded sleeve 43 an end face of which may engage the pegs 42, or may engage an intervening thrust ring 44 which engages the pegs. The sleeve is keyed to the body 17 in a similar manner to the sleeve 23 of Figure 1. The externally threaded sleeve is engaged by an internally threaded ring 45 mounted in the chuck body and rotated by gearing 31, 32 in a somewhat similar manner to that described above, by these means the pegs 41 may be thrust into the block 38, and in so doing cause relative axial movement between the conical socket 24, and the chuck body.

In the construction shown in Figure 3 two sets of jaws 10 and 11 are provided, the jaws in each set being cut away to accommodate a rubber ring 15 which is bonded to those faces of the cut away portions which are at right angles to the axis of rotation. The resulting two units are arranged on opposite sides of and abut the annulus 14 and the two rubber rings are bonded to it. The socket 23 is fixed to a hollow spindle 46, and the relative movement between the conical surface 24 and conical surface on the flange 12 at opposite ends of the jaw unit may be effected solely by relative rotation between the threaded sleeve 20 and the chuck body.

In yet a further alternative arrangement shown in Figure 4 the sleeve 20 with the inwardly directed conical flange 21 is arranged to be in direct threaded engagement with the part 47 provided with the conical socket 24.

In the arrangement shown in Figure 5 the jaw unit comprises a single set of jaws 48 having oppositely inclined outer edges 49 and 50 at opposite ends thereof, the centre portions at the outer edges of the jaw are recessed at 51 and the recesses encircled by a metal ring or carrier 52 of lesser axial width than the recesses, and each side of the ring is bonded to an opposed side wall of the recess in each jaw by small rubber block 53. Such a unit may be used in any of the chuck bodies referred to above.

We claim:

1. A chuck comprising two axially adjustable body parts each formed with a conical socket, a carrier plate disposed between the two sockets and having a central aperture, two separate sets of jaws one on each side of said carrier plate and having inclined outer edges engaging said conical socket and rubber members bonded between the faces of said carrier plate and said jaws, and means for imparting relative axial movement to said adjustable body parts.

2. A chuck according to claim 1, wherein the ends of the jaws adjacent the faces of the carrier plate are cut away to form recesses and wherein the rubber members which are bonded between the faces of the carrier plate and jaws are located in these recesses.

3. A chuck according to claim 1, wherein the ends of the jaws adjacent the carrier plate are cut away to form recesses which extend inwardly from the outer edges thereof leaving heel portions which abut against the carrier plate and wherein said rubber members which are bonded between the faces of the carrier plate and jaws are located in these recesses.

4. A chuck according to claim 1, wherein the ends of the jaws adjacent the carrier plate are cut away to form recesses which extend inwardly from the outer edges thereof leaving heel portions which abut against the carrier plate and wherein said rubber members are located in said recesses and are bonded only to the faces of the carrier plate and the opposed faces of said cut away portions.

5. A chuck according to claim 1, wherein the jaws of one set are arranged opposite the jaws of the other set and the ends of the jaws adjacent the carrier plate are cut away to form recesses and wherein the carrier plate is formed with holes at locations opposite said cut away portions and wherein said rubber members are located in said recesses and extend through said holes and are bonded only to the faces of the carrier plate and the opposed faces of said cut away portions.

6. A chuck according to claim 1, wherein the ends of the jaws adjacent the faces of the carrier plate are cut away to form recesses and wherein the rubber members comprise two rubber rings arranged on opposite sides of the carrier plate and disposed within said recesses and bonded to the faces of the carrier plate and to the opposed faces of the cut away portions.

7. A chuck according to claim 1, wherein the jaws of the two sets are arranged opposite one another on opposite sides of the carrier plate and those ends adjacent the carrier plate are cut away to form recesses and wherein the carrier plate is formed with holes opposite the cut away portions and wherein the rubber members comprise two rubber rings arranged on opposite sides of the carrier plate and disposed within said recesses and joined with one another by portions extending through said holes and wherein the rubber rings are bonded only to the faces of the carrier plate and to the opposed faces of the cut away portions.

References Cited in the file of this patent

UNITED STATES PATENTS

| 2,403,136 | Stoner | July 2, 1946 |
| 2,466,129 | Stoner | Apr. 5, 1949 |